Figure 12:
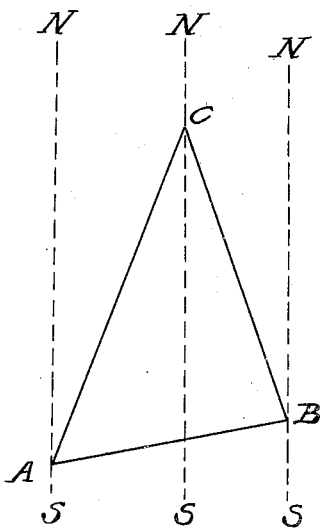

Sept. 14, 1948. G. E. TARDIF 2,449,342
PLOTTING AIRCRAFT NAVIGATION COMPUTER
Filed Sept. 9, 1943 4 Sheets-Sheet 1
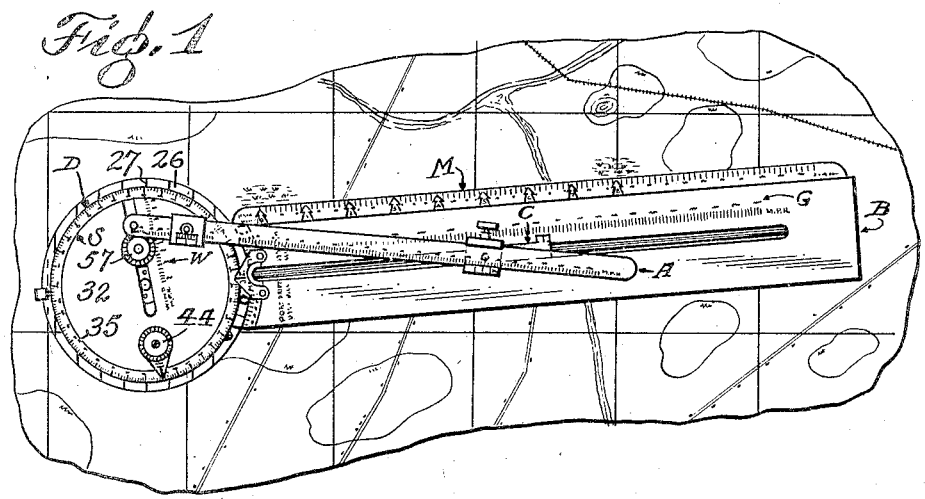
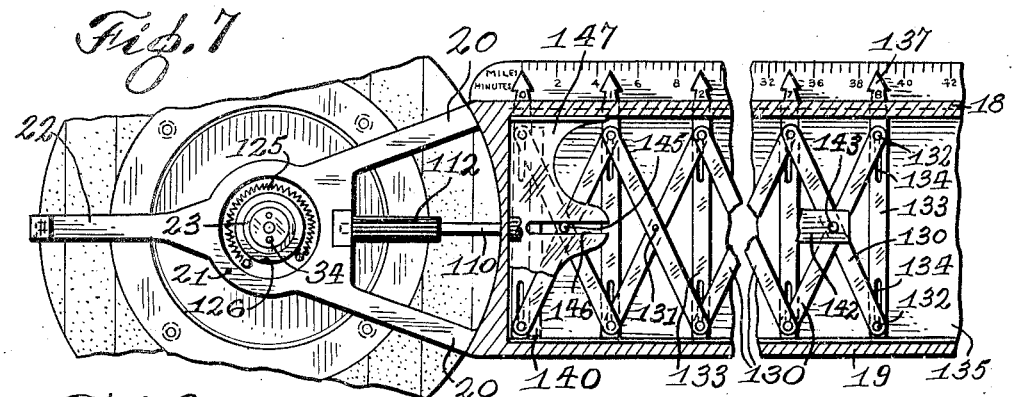
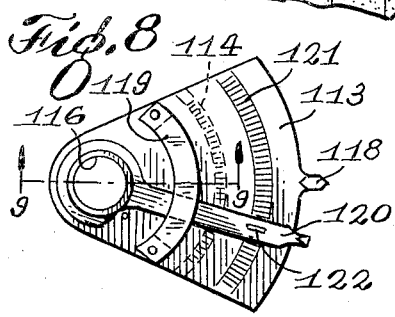
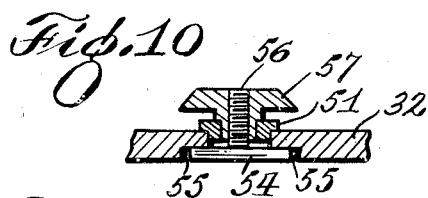
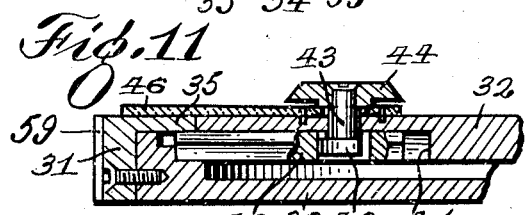
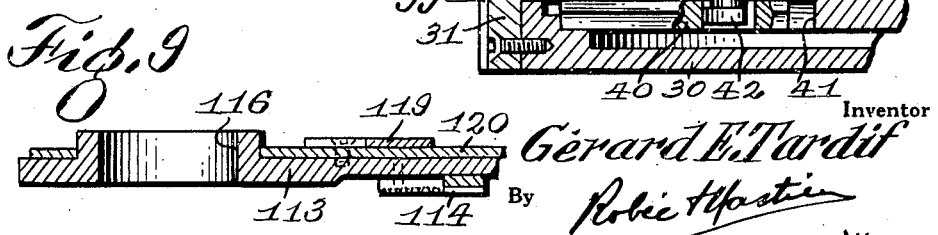
Inventor
Gérard E. Tardif
By Robie Hastie
Attorneys

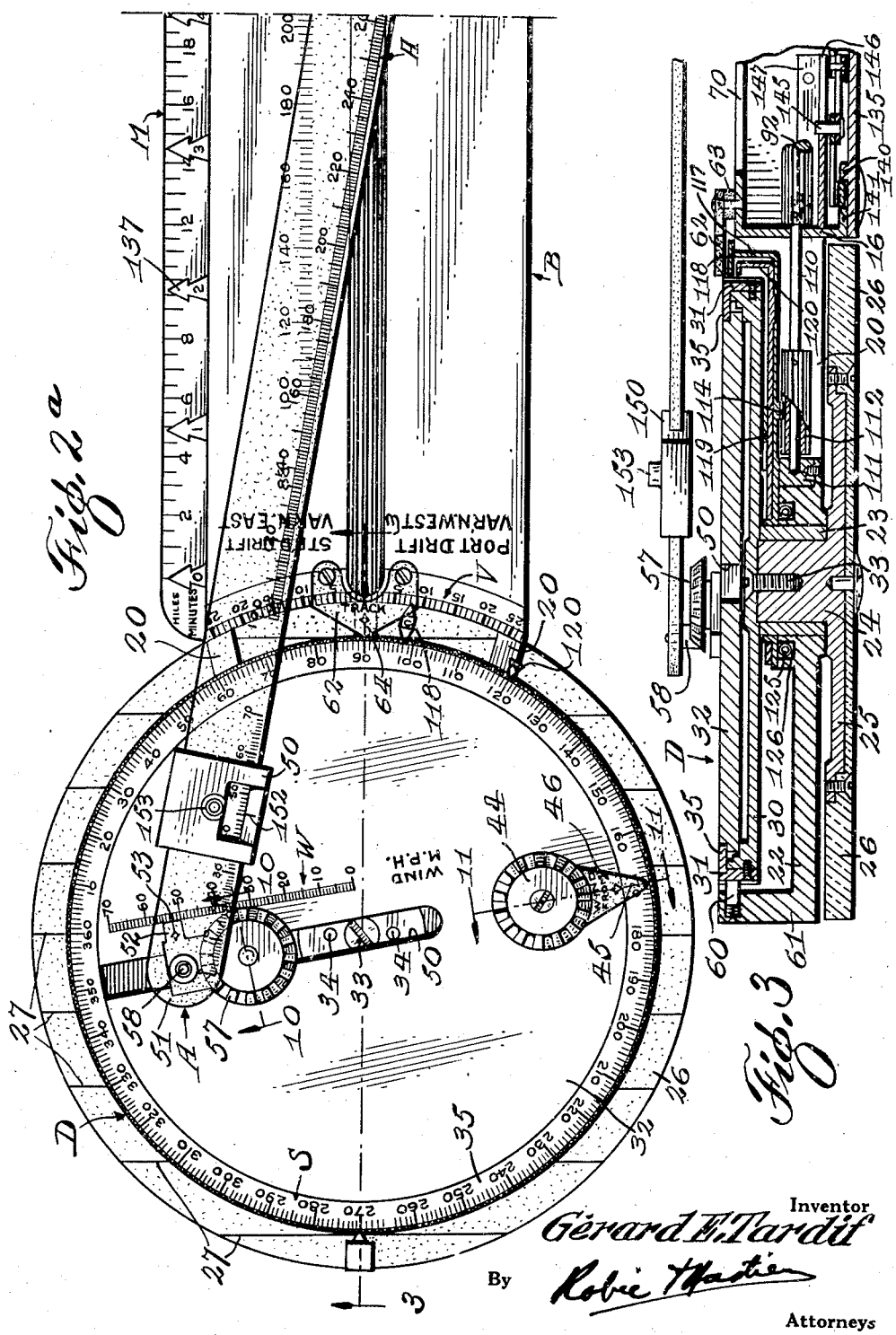

Sept. 14, 1948. G. E. TARDIF 2,449,342
PLOTTING AIRCRAFT NAVIGATION COMPUTER
Filed Sept. 9, 1943 4 Sheets-Sheet 3
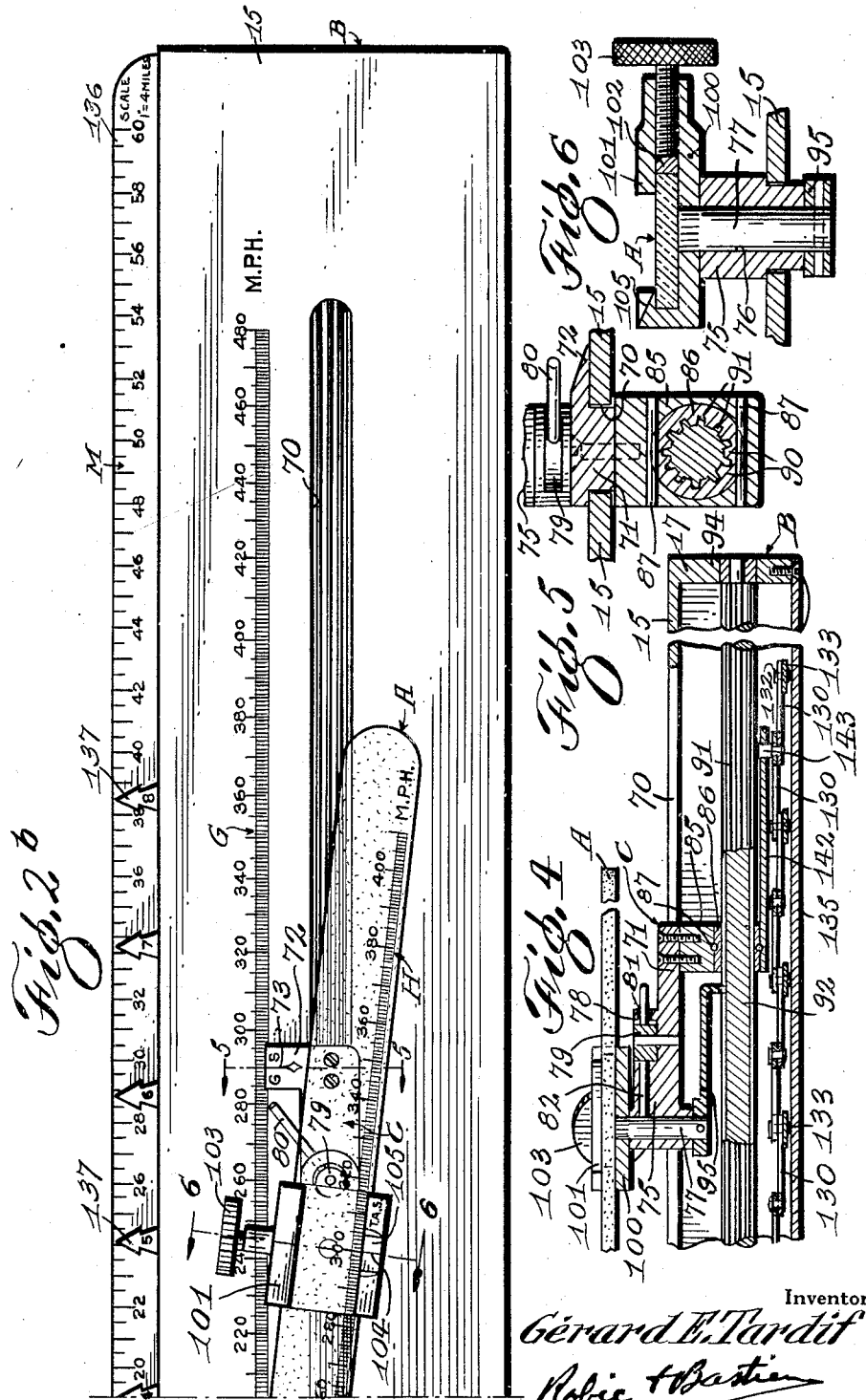
Inventor
Gérard E. Tardif
Robic & Bastien
Attorneys Patented Sept. 14, 1948

2,449,342

UNITED STATES PATENT OFFICE 2,449,342

PLOTTING AIRCRAFT NAVIGATION COMPUTER

Gerard E. Tardif, Quebec, Quebec, Canada

Application September 9, 1943, Serial No. 501,648

4 Claims. (Cl. 235—61)

The present invention relates to a navigational computer and, more particularly, such a computer for air navigation adapted to plot directly on a suitable map the course and speed of an aircraft.

The effect of wind, on the course of flying aircraft, must be taken in consideration if the navigation is to be accurate; the determination of this effect can be arrived at by means of calculations, the use of tables, simple calculators or, more generally, by means of mechanical computers reproducing to scale the triangle of velocities represented by vectors corresponding to: wind direction and magnitude (W), the speed and course of the flying craft in the air (A. S.) and the actual resultant course and speed of said craft with respect to the ground (G. S. or track).

The devices typical of said mechanical computers comprise, essentially, a frame having a pivoted arm indicating ground speed, or track, and a wind dial or disc on which the wind direction and velocity can be indicated and having means co-operating with the pivoted arm.

Those versed in this art of air navigation know that such computers have certain drawbacks such as lack of accuracy, and a fundamental structural arrangement preventing the possibility of plotting directly on a map the computed course and speed.

This is due to the peculiar construction of said computers, wherein the ground speed, or track, is only readable on the pivoted arm; the computed result must, consequently, be transferred to a map by means of dividers or other complicated extension mechanisms.

Still another type of the above computers has the ground speed on the base of the instrument; due, however, to other characteristics, said type of computers cannot be used to plot directly on a map the result of the computation.

The present invention has been conceived to avoid the drawbacks noted above in an instrument of high accuracy and usable directly on a suitable map for plotting purposes.

Consequently, the main object of the invention may be stated to reside in the provision of an air navigation computer of improved efficiency and accuracy for plotting directly on suitable maps.

Another important object is the provision of such an instrument obtainable at relatively low cost for the performance in view.

A further object concerns an instrument of the character described which is compact, rugged and of simple manipulation.

Other objects and advantages of the invention will become apparent as the description progresses.

Before proceeding with a detailed description of a specific computer, according to the invention, it is believed that a general disclosure of the basic characteristics of this computer shall facilitate further comprehension of the invention.

As in the other computers reviewed above, the present instrument has a disc having a compass dial and wind velocity indicating scale, and a pivoted arm on which the air speed and course, or heading, are indicated, said arm and disc being connected together to represent two vectors of the triangle of velocities, the remaining "track" vector being constituted by the base of the instrument.

The said track vector being in the form of a scale on the base of the instrument, the graduations thereof have been disposed at the very edge of said base which is adapted to be used directly on a suitable map. Furthermore, and this is the basic characteristic of the present device, the wind dial or "wind disc" as it will be called throughout the text and claims is pivoted at one end of the base, outside thereof, so that arcuate movement of said base is possible around the wind disc as a center.

Inasmuch as said wind disc is provided with meridian lines, adapted to line up the 180°–360° axis of said disc with the true North meridian lines of a map, it will be evident, therefore, that the position of the base on the great circle, with respect to the meridian-fixed disc, will be the actual angular direction of the track or ground speed of an aircraft. Consequently, being given a point of departure disposed on said base lined up with a given spot of a suitable map, the exact point of arrival can be found directly on the map opposite the track scale.

In order to facilitate this reading, a pantograph arrangement of lazy tongs is provided over said track scale, actuated by the pivoted arm, and indicative of the distance covered in so many minutes at so many miles per hour. Thus, therefore, in solving problems of interception, the operator can know exactly over what point of the map an aircraft will be after a given number of minutes at a definite speed.

Figure 13:
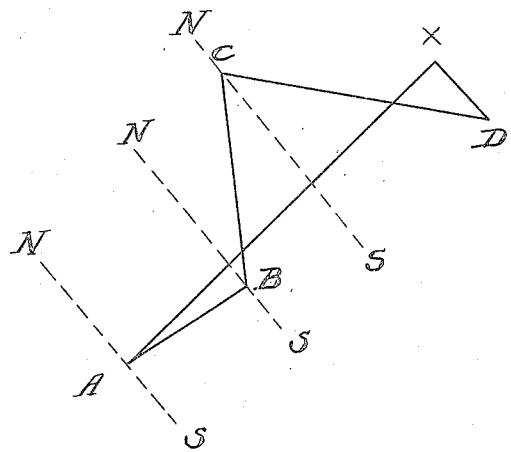

Referring, now, to the drawings wherein an embodiment of the invention is illustrated as an example, Figure 1 is a plan view of the computer disposed directly on a topographical map, Figure 2a is a partial plan view of the instrument showing the left hand side thereof, Figure 2b is a complementary plan view of the right hand side of said instrument, Figure 3 is a vertical section through the wind disc taken on line 3—3 of Figure 2a, Figure 4 is a partial vertical section taken longitudinally of the instrument base, Figure 5 is a vertical section taken on line 5—5 of Figure 2b, Figure 6 is another vertical section taken on line 6—6 of Figure 2b, Figure 7 is a partial top plan view of the instrument with wind disc removed and top of base cut away to show the pantograph arrangement of the lazy tongs, Figure 8 is a plan view of the wind disc toothed "course" sector, Figure 9 is an enlarged section of said sector taken on line 9—9 of Figure 8, Figure 10 is a section taken on line 10—10 of Fig. 2a, Figure 11 is another section taken on line 11—11 of Figure 2a, Figure 12 is a diagram of wind, air speed and ground speed vectors used in calculations embodying the present instrument; and Figure 13 is another diagram of an assumed bombing run from a starting point to a target.

In the drawings, wherein similar reference characters represent corresponding parts throughout, the reference letter A indicates the pivoted arm, the letter B the base, and the letter D the wind disc.

The base B, as shown, consists of a narrow, elongated body having a flat top portion 15, downwardly depending end walls 16—17, and side walls 18—19. There is thus formed a box-like open-bottomed casing of metal or other suitable rigid material adapted to resist distortion and to retain its dimensions within close limits.

At the concave front end wall 16, and formed integral therewith, is arranged an extension comprising converging arms 20 merging together to form an enlargement 21 and tapering outwardly, beyond said enlargement, to constitute an extension 22 the purpose of which will be explained later.

As shown to advantage in Figures 3 and 7, the enlargement 21 is provided to act as a bearing for the wind disc D, which bearing is in the form of a bronze, or the like, sleeve 23 press-fitted into a suitable aperture bored in the center of said enlargement.

This sleeve 23 is adapted to receive a circular projection 24 extending upwardly from the center of a disc-like member 25 to which a disc 26 of transparent material is secured by screws. Said disc is provided with parallel meridian lines 27 for aligning the same with the meridian lines of a map, the transparent nature of the disc enabling the easy performance of this operation.

Again referring to Figure 3, it will be seen that the wind disc proper D consists of a centrally depressed cup 30, a flanged rim 31, and the circular wind plate 32. This wind disc is attached to the top of member 24 by means of a screw 33 and locating pins 34 (Figs. 2a and 7) securing the cup 30 to said member for rotation therewith. The rim 31 is in turn screwed to the peripheral edge of said cup and is provided with an inwardly directed marginal flange 35, overlapping slightly the outer edge of the wind plate 32, to retain the same in position by means of a small rabbet, cut circumferentially at the upper edge of said plate, and in which rabbet the inner end of the flange is adapted to extend.

Thus, the transparent disc 26, the cup 30 and the rim 31 being secured together, are adapted to move as a unit in the sleeve 23; while the wind plate 32 can be moved independently of this unit, although means are provided to lock said plate and cup together as will be presently described.

Said locking means are shown in Figure 11 and include a plunger movable in a recess 41, cut in the plate 32, and operable by a cam 42 formed at the end of a pin 43 to which a knob 44 is secured. From the foregoing, it will be evident that rotation of the knob 44 shall cause the cam to extend, or retract, the plunger from contact with the inner side of the cup 30; consequently, the wind plate may be locked with, or freed from, the said cup and associated parts.

Inasmuch as the wind plate is adapted to assume relative positions with respect to the rim flange 35, said last is provided with a degree scale S extending completely around from 0 to 360 as shown clearly in Fig. 2a. In order to obtain accurate registration of the wind plate with respect to the graduated flange, a reference pointer marked "Wind from" is formed of a line 45 cut underneath a transparent tab 46 secured, underneath the knob 44, to the face of the plate 32 (see Fig. 11). Therefore, the wind plate can be accurately located, and locked, in any angular position with respect to the degree scale S; this angular position representing the wind direction.

The magnitude, or velocity, of the wind is indicated on the wind plate on a wind scale W, graduated from 0 to 70 miles an hour. This scale is adjacent to, and on one side of, a radial slot 50 cut in the wind plate 32, in which a slider 51 is movable longitudinally. Said slider includes a tab 52 extending to the edge of scale W and provided with a reference line 53 for accurately locating same with respect to the scale. For locking said slider in place, a plate 54, movable in a rabbet 55 cut underneath and on each side of the slot 50, is secured to a screw 56 extending upwardly, through the slider, and engageable with a knurled knob 57 adapted to be screwed over said screw 56. Thus, tightening the knob causes clamping of the the slider 51 in rigid position against the plate 32. Finally, the slider is completed by the addition of a stud 58 (Figs. 2a and 3) upstanding from the upper surface of said slider and adapted to receive a collar secured to the end of the movable arm, as will be described later.

It is important to note, at this point of the disclosure, that the scale S engraved on the margin of the wind disc is in fixed relation with respect to the meridian lines 27, said lines running in a parallel position with the 360°—180° axis of said disc. Therefore, the great circle represented by the scale S is always in its proper relation with the true north and, obviously, any wind direction, set by rotating plate 32, is also in proper angular position with respect to said north.

Other minor parts associated with the wind disc include a spring pressed plunger 60 housed in a vertical pillar 61 formed at the end of extension 22, and the plunger of which engages peripheral notches 59 cut in the rim 31 (Figs. 3–11). Furthermore, a transparent index tab 62 is secured to the inner end of the top 15 and raised therefrom by means of spacers 63 (Figs. 2a–3). Said tab has an index line 64 formed thereon to represent the arcuate position of the "track" with respect to north, as shown in the scale S opposite.

Referring now to Figures 2b—4—5 and 6, wherein the base B and associated parts are specifically shown, it will be seen that the top 15 is provided with an elongated longitudinal slot 70 in which a sliding carriage, generally indicated at C, is movable (Fig. 4). Said carriage comprises a body 71 overlapping the edges of the slot 70 and having an index tab 72 provided with an index line 73; said line cooperates with a ground speed scale G, calibrated in miles per hour, and used for locating the position of the carriage C as a function of the ground speed of an aircraft.

Said carriage further embodies an elevated enlarged portion 75 disposed at the front end of the carriage and bored vertically at 76 to provide a bearing for a shaft 77. The portion 75 is further bored at 78 to receive a cam 79, said cam having an actuating handle 80 extending outwardly through a slot 81 cut in the rear side of the portion 75 as shown in Figures 4–5. An horizontal bore is also formed in the portion 75, between the bores 76 and 78, adapted to receive a plunger 82 which, acted upon by the cam 79, is adapted to frictionally engage the shaft 77 when it is desired to prevent rotation thereof or lock the same in place.

At the rear of the carriage (Figs. 4–5), a downwardly depending block 85 is suitably secured, said block having an horizontal bore in which a bushing 86 is journalled. Side motion of said bushing within the block is prevented by means of pins 87 disposed in the block and engaging a circumferential groove formed in the bushing. Thus, the said bushing is adapted to revolve within the block 85 in a fixed longitudinal relation with respect thereto.

As shown to advantage in Figure 5, the bushing is machined internally to have splines, or teeth 90, whereby said teeth may mesh with similar teeth 91 formed on an elongated pinion rod 92 journalled at both ends of the base in alignment with the longitudinal axis thereof below the slot 70. Consequently, the bushing 86 is adapted to slide, with the carriage, longitudinally over the rod 92 to support the same in a constant spatial relation with respect to the carriage.

This proper positioning of the rod 92 is necessitated by the fact that a toothed sector 95 pinned to the lower end of the shaft 77 meshes also with the pinion rod which, consequently, cannot be allowed to sag if proper meshing with the sector 95 is to be maintained at all points of the pinion rod.

This sector 95 is movable with the shaft 77 which, in turn, is secured to a bracket 100 wherein the pivoted arm A is adapted to slide, said arm being constituted of a strip of flexible transparent material. As shown in Figure 6, the arm is retained in place by means of overlapping flanges 101 and adapted to be locked therein through the instrumentality of a locking bar 102 pressed against said arm by means of the thumb screw 103.

Referring to Figure 2b, it will be seen that the position of the bracket 100 along the arm A is regulated by an air speed, or heading, scale H engraved on the transparent arm co-operating with an index line 104 formed in a bevel 105 cut in one of the bracket flanges 101.

Thus, angular movement of the arm shall cause corresponding movement of the toothed sector which, being meshed with the pinion rod, will rotate said pinion accordingly. In order to interpret said angular movement as degrees of drift, on a proper scale, a similar mechanism is found in the wind disc comprising: an extension shaft 110 at the forward end of the pinion rod, said shaft being journalled in a bearing 111 of the enlargement 21 (Figs. 3–7). Pressed on said shaft, there is a stub pinion 112 of the same physical dimensions as rod 92 and the teeth of both are aligned. Meshing with said stub pinion, there is provided an indicating sector 113 having gear teeth 114 and a central bore 116.

This sector is freely journalled over the outer diameter of the sleeve 23, under the cup 30, and embodies an angular extension 117 projecting upwardly to a position level with the flange 35, said extension having a double pointer 118, marked C (course) operable to indicate on both scale S and another scale V formed on the concave inner end of the base, both scales being parallel and adjacent, as shown in Fig. 2a. This scale V indicates the drift caused by the wind effect and is extended equally on both sides of the base axial center to indicate "Port drift" or "Starboard drift," as the case may be.

Frictionally held over said sector 113, by means of a strap 119, an additional pointer 120 is provided to indicate magnetic course, said pointer being movable with the sector but adjustable according to local magnetic variations. This pointer is marked M and projects upwardly to a position below pointer 118, so as to pass underneath. (See Figs. 3—8—9.) In order to prevent undue movement of said magnetic course pointer, after setting, a corrugated arc 121 is formed on the upper surface of sector 113 with which arc a dent 122, made in the pointer, is adapted to co-operate frictionally for purposes of stability.

Finally, to allay as much as possible the effects of backlash on the gear train just described, a coiled spring 125 is housed in a circular depression 126 cut in the enlarged portion 21 concentrically of the sleeve 23, said spring being attached at one end to said portion 21 and, at the other end, to the sector 113. Thus, said sector is always pulled against the teeth of pinion 112 which, in turn, is held against the teeth of sector 95 normally held in stationary position.

As previously stated, the present instrument embodies a lazy tongs arrangement for indicating directly on a scale the relation between time of flight and speed as a function of distance. This arrangement is shown in Figures 5–7 and, to some extent, in Fig. 3: it includes a plurality of links 130 pivoted in pairs at their exact center by a pin 131 and joined together at their ends by shoulder pins 132.

The links are supported in the base of the instrument by means of parallel cross bars 133 having longitudinal slots 134 engaging the shoulder of the pins 132 and allowing for the transverse movement of the links ends. Said bars 133 rest on a bottom cover 135 secured to the base and extending on the upper side to form a bevelled edge 136 having engraved thereon a mile scale M and, over which scale the outer end of each bar projects through a slot in the upper side of the base. As shown in Figure 7, said outer end of the bars is shaped to represent a pointer 137 numbered consecutively, from the left, 0 to 8 inclusive, while the other, inner end of the bars, moves in a longitudinal recess of the lower side (not shown) to prevent upward movement of the lazy tongs arrangement.

The first bar 137, numbered 0, is held rigidly in stationary position by means of a stop rib 140 formed in the base cover 135, and acting to secure the said bar against a flange 141 of the base (see Fig. 3). At the other end of the pantograph, constituted as above described, the middle point of the last pair of links 130 is pivoted at 143 to an extension arm 142 integral with, and extending from, the block 85 for actuation of said pantograph in correspondence with the movements of the carriage C. The proper guiding of the links, as a whole, is insured by an extension pin 145, securing the first pair of links together, and guided in a straight longitudinal path along the slot 146 cut in a bracket 147 secured to the inner end of the base (Figs. 3 and 7).

Thus, as the carriage C is moved longitudinally, the pantograph will be extended, or contracted, accordingly, whereby the spacing of the bars 133 will vary correspondingly. Since the spacing of the pointers is, therefore, in a direct ratio to the ground speed, indicated by the pointer 73 on the scale G, the characters indicated on said pointers will show on the scale M the distance travelled in so many minutes.

Inasmuch as the scale M is made to represent one mile each quarter inch, the instrument may consequently be used directly on topographical maps which, usually, are scaled on the same basis.

The operation of the present computer can best be described by solving actual air navigation problems. But, first, it is desirable to review briefly the theory of the triangle of velocities, basis of dead reckoning navigation. There are six factors involved as shown in Figures 12 and 13: (1) wind speed, (2) wind direction (Fig. 12, line AB), (3) true air speed, (4) course (line BC), (5) ground speed, and (6) track (line AC); all directions relative to imaginary north-south lines (NS). The computer of the invention further amplifies factor No. 5, ground speed, in that due to its typical construction, it is possible to read and plot directly relative positions of an aircraft in flight at various periods of time, also determining mechanically its velocity in a unit period of time. All of the above either after, during or in anticipation of a flight. Thus factor No. 5 is further broken down into the following: (5a) relative positions in terms of periods of time, (5b) speed per period of time (normally minute). Knowing any four of the basic factors 1 to 6, the other two can be determined, whereby either factors 5a or 5b can be substituted for basic factor 5, without calculations, in solving mechanically the triangle of velocities.

As a problem, suppose it is desired to establish a bombing run from known point A to target X (Fig. 13). Wind velocity is determined accurately by the multiple drift method by sending an aircraft ahead, departing from point A at 1900 hours and formation at 1922 hours to reach target at 1935 hours. The turns will be rate—1 (360° in two minutes). Further, it is desired that the aircraft turn into target X and cross same for the purpose of dropping incendiaries 10 minutes ahead of formation.

The various factors involved are listed as follows:
Known or observed—Plain figures.
Calculated by various means—Italic figures.
Determined by instrument of the invention—Parentheses.

As the compass courses are known and times calculated for the first three legs an air plot will be carried and point D established from its air position and the determined wind velocity. The turns will be made at a greatly reduced air speed in order that the orbits will cover the least possible distance. Turns B, C, and D will take 14, 30 and 36 seconds, knowing the angle and rate of turn. The total time for the check flight is calculated as 25 minutes or an average of 6 minutes for each leg. By inspection it is decided to allow the following: AB—5 min.; BC—7 min.; CD—9 min.; DX—4 min. As an air plot is carried, wind is made to read zero by releasing knurled knob 57 (Fig. 2a) and moving slider 51 along radial slot 50 until line 53 appears opposite zero of scale W. Knurled knob 57 is then tightened thus locking assembly in position. Course shown at pointer 118 coincides with track shown at line 64, both being read along the degree scale S. The first leg AB is now plotted on suitable map as follows: known compass course of 100° is reduced to true course of 083° (100°+3° E deviation—20° W variation) and set on instrument by turning wind disc D until line 64 appears opposite 083° along degree scale S. True air speed is set by releasing thumb screw 103 (Fig. 2b) and moving carriage C along longitudinal slot 70 until line 104 appears opposite 286 M. P. H. of scale H. Thumb screw 103 is then tightened, locking arm A at this position. Instrument is then moved on map so that pointer O of bar 137 is held opposite point A and instrument pivoted until lines 27 are made parallel to suitable meridian of map (Figs. 1 and 2a). Then air position of point B is plotted by drawing a pencil line on map along bevelled edge 136 from point A to pointer 5 of bar 137 as the time of flight along this course is five minutes. A similar procedure is followed for plotting air positions of points C and D by setting on instrument respective courses of 038° and 124°. The drifts along legs AB, BC, and CD have been observed as 12°, 5° and 11° all starboard respectively. Prior to turning onto target X at point D the wind velocity is determined and immediately thereafter called over to the formation leader by radio. The wind velocity is determined as follows: true air speed of 286 M. P. H. is set as previously described. Transparent air speed arm A (Fig. 2a) is lifted at one end from stud 58 and pivoted about shaft 77 (Fig. 4) until pointer 118 indicates 12° starboard along scale V. The assembly is locked in this position by turning handle 80. Wind disc D is rotated until true course 083° read on scale S appears opposite pointer 118. By sliding carriage C back and forth along slot 70 a pencil point inserted through hole at end of arm A will draw

| | | Leg AB | Leg BC | Leg CD | Leg DX | Leg AX |
|---|---|---|---|---|---|---|
| 1 | Course (Compass) | 105° | 060° | 145° | 025° | 100°. |
| 2 | Deviation (Compass) | 1° W | 1° W | 0° | 2° W | 2° W. |
| 3 | Course (Magnetic) | 104° | 059° | 145° | (023°) | (098°). |
| 4 | Variation (Magnetic) | 21° W | 21° W | 21° W | 21° W | 21° W. |
| 5 | Course (True) | 083° | 038° | 124° | 002° | 077°. |
| 6 | Indicated Air Speed | 260 M. P. H. | 260 M. P. H. | 260 M. P. H. | 320 M. P. H. | 325 M. P. H. |
| 7 | Pressure Alt. (feet) | 10,000 | 10,000 | 10,000 | 10,000 | 10,000. |
| 8 | Temperature | −33° C | −33° C | −33° C | −30° C | −30° C. |
| 9 | True Air Speed (M. P. H.) | 286 | 286 | 286 | (354) | (360). |
| 10 | Air distance (Miles) | (23.8) | (33.4) | (42.9) | (23.6) | (78). |
| 11 | Time of Departure (hrs.) | 1900 | 1905 | 1912 | 1921 | 1922 |
| 12 | Time of leg (Minutes) | 5 | 7 | 9 | 4 | 13. |
| 13 | Time of arrival (hrs.) | 1905 | 1912 | 1921 | 1925 | 1935. |
| 14 | Time of turn (Seconds) | 14 | 30 | 36 | | |
| 15 | Drift (observed) | 12° Stbd | 5° Stbd | 11° Stbd | (4° Port) | (9° Stbd). |
| 16 | Track | (095°) | (043°) | (135°) | (358°) | (086°). |
| 17 | Ground Speed (M. P. H.) | (264) | (230) | (305) | (297) | (332). |
| 18 | Miles/Minute | (4.4) | (3.8) | (5.1) | (4.9) | (5.5). |
| 19 | Distance (miles) | (22) | (26.8) | (45.7) | (19.8) | (72). |
| 20 | Location of points | A (B) | (B) (C) | (C) (D) | (D) X | AX. |
| 21 | Wind velocity (miles) | (from 020° at 60 M. P. H.) | | | 020/60 | 020/60. | a straight line across plate 32 parallel to track. The same procedure is repeated for the next leg (drift 5° starboard compass course 060° reduced to true) and a line drawn across plate 32 will intersect previous line drawn. A third line is obtained (using drift 11° starboard compass course 145° reduced to true) and will normally intersect the other two so that a small triangle called a "cocked hat" is formed on plate 32. Care is to be taken that locking handle 80 is always released before pivoting air speed arm A. The center of the "cocked hat" is the wind point. After reinserting end of arm A over stud 58 wind disc D is turned so that wind point appears directly underneath longitudinal axis of arm A. Cursor 150 is moved along arm A to the position where wind point can be vertically sighted through sight hole 151 (Figs. 2a, 3). Wind speed is read at line 152 along scale X as 60 M. P. H. Wind direction is read at pointer 45 along scale S as from 020°. To establish the location of point D wind disc D is rotated until 020° on scale S appears opposite line 64 of tab 62. Instrument is positioned on map so that pointer O of bar 137 appears opposite air position of D and lines 27 of transparent disc 26 are made parallel to convenient meridian of map with the north as indicated by 360° on scale S in the same direction as true north of the map. Then knowing that the total time elapsed for legs AB, BC and CD is or will be 20 minutes and that the wind is 60 M. P. H. therefore the distance the aircraft is blown along the line forming an angle of 020° with true north is calculated as 20 miles and plotted on the map opposite 20 of graduated scale M. Magnetic variation of 23° west is set by sliding pointer 120 away from pointer 118 an angular distance of 23° greater than degrees shown at pointer 118 along scale S. The wind velocity previously found is now indicated on instrument as follows: Knurled knob 44 is released and wind plate 32 turned inside flanged rim 31 until line 45 of tab 46 appears over 020° of scale S. Then knurled knob 44 is tightened holding assembly in this relative position. Knurled knob 57 is released and slider 51 moved along radial slot 50 until line 53 of tab 52 appears opposite 60 M. P. H. of scale W. Knurled knob 57 is then tightened. The instrument is now positioned on map with pointer O of bars 137 opposite point D and bevelled edge 136 along line joining D and X. With thumb screw 103 released, carriage C is moved along longitudinal slot 70 until bars 137 extend in such a position that pointer 4 indicating 4 minutes of flight from D to X, appears opposite X. Wind disc D is rotated to a position where lines 27 are made parallel to a convenient meridian of map. Then factors desired are read at pointer 118 (course true), pointer 120 (course magnetic), line 64 (track), line 73 (ground speed), line 104 (true air speed), opposite target X on scale M (distance travelled), pointer 118 (drift), pointer 1 of bar 137 (ground speed per minute). Similarly, legs AX, AB, BC and CD may be plotted and the unknown factors determined.

As may be seen by the above examples, the instrument of the invention may be used both for plotting on a map resultants of factors which have previously been indicated thereon, or transferring known factors from the map directly to determine resultant factors.

The above examples involve short distances. Navigation problems involving long distances are similarly solved by cutting them down into a series of short segments along a line drawn between the distant points, their relative bearings being known or calculated on a larger scale map.

A suitable equal-area projection such as the Lambert Conformal may be used for plotting and mean meridians along short segments are used as a basis of plotting, thus resulting in a series of short S-shaped rhumb lines for tracks and approaching to a degree not normally possible on plotting charts based on Mercator projection, the great circle or shortest distance between two points. It is apparent that topographical features appearing on the map used for plotting may be directly identified with actual ground features, or that calculated position by dead reckoning plotted on this map shows position relative to such ground features. Very short periods of time or very short distances may thus be directly identified on the map in relation to ground features.

This is possible, as previously explained, by the relative rotation of the wind disc with respect to the base, or vice versa, and the fact that the said wind disc is always aligned with the map meridians. Consequently, the angle of the base with respect to said meridians represents the angle of the track also, from the true north.

Consequently, in certain problems of interception, it is possible to know exactly where, from a starting point on the map, a flying craft will be after so many minutes of flying at a given speed; this indication is furnished opposite the appropriate pointer on the scale M, when the O pointer (137) is located at said starting point.

To those versed in this art, many other possible solutions will become obvious and possible with this instrument.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. A navigational computer of the character described, comprising a wind disc, a base pivoted at one end to the center of said disc, said disc being rotatable with respect to said base, means on the disc for locating same on a suitable map, an arm pivoted at one end to the disc and slidably connected at the other end to a bracket slidable longitudinally on the base, and a pantograph connected at one end to the base and at the other to the slidable bracket, said pantograph having cross bars extending as pointers on the edge of base, whereby the track, point of departure and location of a flying craft after a given time at a given speed will be indicated directly on the map.

2. In an instrument of the class described having a wind disc, a base and an air-speed movable arm, means for pivoting the disc outside the base at one end thereof, meridian lines formed on the edge of the disc for locating same in position with respect to the meridian of a suitable map, and continuously variable spacing pointers disposed on one edge of the base and actuated by the arm, said pointers indicating the position of a flying craft as a function of time speed and angle of track.

3. In a computer of the character described for map plotting purposes, a base having a ground-speed scale, a wind disc rotatable at one end of said base, a longitudinally movable carriage on the base along its scale, a radially movable slider on the wind disc, an arm pivoted at one end to the slider and having its free end slidable in the base carriage, said arm carrying an air-speed scale with which the carriage is adapted to be located, and a parallel-bar pantograph secured at one end to the base and at the other to the carriage, the parallel bars thereof extending to the edge of the base over a time-mile scale to indicate thereon the position of a flying craft as a function of time at the speed indicated on the arm by the position of the carriage.

4. In an air navigation computer, a base having a longitudinal air-speed scale, a wind disc pivoted on an extension outside said base, a pivot movable radially on the disc on a wind-velocity scale, a carriage movable along the base scale, an air-speed scaled arm pivoted at one end to the pivot and slidably engageable at the other with the carriage, a pantograph attached at one end to the base and at the other to the carriage so as to extend or contract in accordance with the position thereof, parallel cross bars associated with the pantograph to assume a spacing proportionate to the extension or contraction thereof, and a distance-time scale at the edge of the base over which the cross bars extend.

GERARD E. TARDIF.

REFERENCES CITED

The following references are of record in the file of this patent:

UNITED STATES PATENTS

| Number | Name | Date |
|---|---|---|
| 1,828,807 | Kennedy | Oct. 27, 1931 |
| 1,910,093 | Colvin | May 23, 1933 |
| 1,949,946 | Viehmann | Mar. 6, 1934 |
| 2,247,531 | Thurston et al. | July 1, 1941 |
| 2,339,222 | Hokanson | Jan. 11, 1944 |